US010161463B2

(12) United States Patent
Ohno et al.

(10) Patent No.: US 10,161,463 B2
(45) Date of Patent: Dec. 25, 2018

(54) DRIVING FORCE TRANSMITTING APPARATUS

(71) Applicant: JTEKT Corporation, Osaka-shi (JP)

(72) Inventors: Shun Ohno, Anjo (JP); Takashi Hosokawa, Takahama (JP); Mikiharu Oyabu, Chiryu (JP); Akio Matsumoto, Anjo (JP); Yoshinori Suzuki, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 50 days.

(21) Appl. No.: 15/270,212

(22) Filed: Sep. 20, 2016

(65) Prior Publication Data

US 2017/0089403 A1 Mar. 30, 2017

(30) Foreign Application Priority Data

Sep. 29, 2015 (JP) .................................. 2015-191683
Sep. 29, 2015 (JP) .................................. 2015-191684

(51) Int. Cl.
*F16D 13/74* (2006.01)
*B60K 17/02* (2006.01)
(Continued)

(52) U.S. Cl.
CPC .............. *F16D 13/74* (2013.01); *B60K 17/02* (2013.01); *B60K 17/346* (2013.01);
(Continued)

(58) Field of Classification Search
CPC ....... B60K 17/346; F16D 13/74; F16D 13/40; F16D 13/46; F16D 213/52; F16D 5/123; F16D 2300/06; F16D 2300/26
See application file for complete search history.

(56) References Cited

U.S. PATENT DOCUMENTS 4,828,089 A * 5/1989 Collins .................... F16D 13/52
   188/251 A
5,704,867 A * 1/1998 Bowen ............... B60K 17/3462
   475/205
(Continued)

FOREIGN PATENT DOCUMENTS

JP   2009-269605   11/2009
JP   2013-100079   5/2013

OTHER PUBLICATIONS

U.S. Appl. No. 15/270,269, filed Sep. 20, 2016, Ohno et al.

*Primary Examiner* — Stacey A Fluhart
(74) *Attorney, Agent, or Firm* — Oblon, McClelland, Maier & Neustadt, L.L.P.

(57) ABSTRACT

A driving force transmitting apparatus is provided which enables rotational resistance of rotating members to be suppressed while sufficiently supplying lubricant to a friction clutch. A driving force transmitting apparatus includes a clutch drum having a cylindrical portion, an inner shaft having an end housed in the clutch drum, a friction clutch having outer clutch plates that rotate along with the clutch drum and inner clutch plates that rotate along with the inner shaft, a piston that presses the friction clutch, and a housing in which a first housing chamber housing the friction clutch is formed and in which a storage chamber storing lubricant scooped up by rotation of the clutch drum is also formed. The lubricant stored in the storage chamber returns to the first housing chamber through an inner circulation path leading to inside the clutch drum and an outer circulation path leading to outside the clutch drum.

6 Claims, 8 Drawing Sheets

(FIRST EMBODIMENT)

(51) Int. Cl.
*B60K 17/346* (2006.01)
*F16D 13/40* (2006.01)
*F16D 13/52* (2006.01)
*F16D 25/08* (2006.01)
*F16D 25/12* (2006.01)

(52) U.S. Cl.
CPC .......... *B60K 17/3462* (2013.01); *F16D 13/40* (2013.01); *F16D 13/52* (2013.01); *F16D 25/083* (2013.01); *F16D 25/123* (2013.01); *F16D 2300/06* (2013.01); *F16D 2300/26* (2013.01)

(56) References Cited

U.S. PATENT DOCUMENTS

| | | | |
|---|---|---|---|
| 2005/0019149 A1* | 1/2005 | Pickelman | F01P 7/042 415/1 |
| 2009/0277711 A1 | 11/2009 | Hoffmann et al. | |
| 2014/0251083 A1 | 9/2014 | Suzuki et al. | |
| 2015/0192198 A1* | 7/2015 | Suzuki | B60K 17/35 180/233 |
| 2015/0240935 A1* | 8/2015 | Kampe | F16H 57/0409 474/91 |

* cited by examiner (FIRST EMBODIMENT)

FIG.2 (FIRST EMBODIMENT)

(FIRST EMBODIMENT)

(FIRST EMBODIMENT)

(FIRST EMBODIMENT)

FIG.7 (MODIFICATION OF FIRST EMBODIMENT)
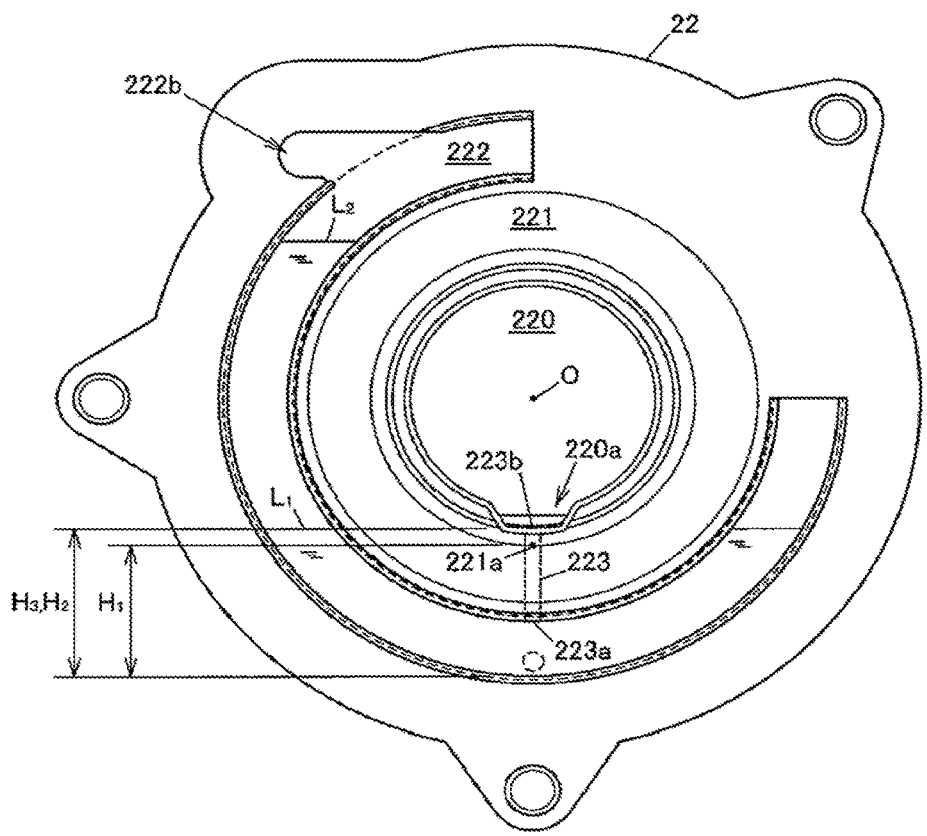
FIG.8 (MODIFICATION OF FIRST EMBODIMENT)
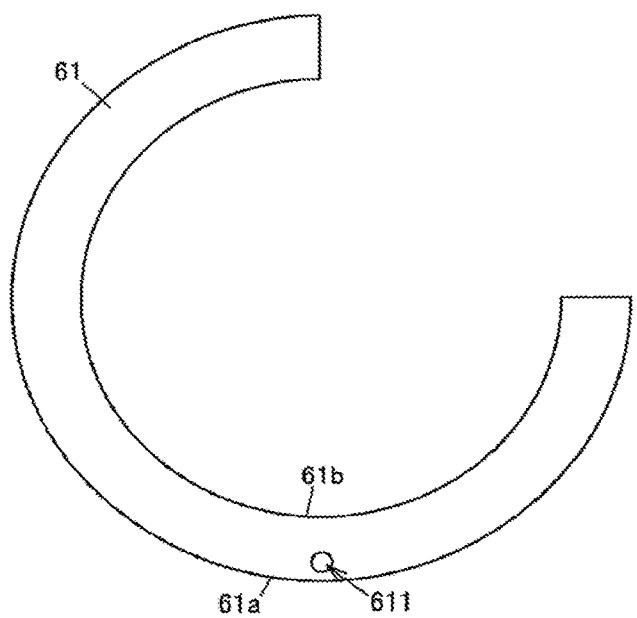

(SECOND EMBODIMENT)

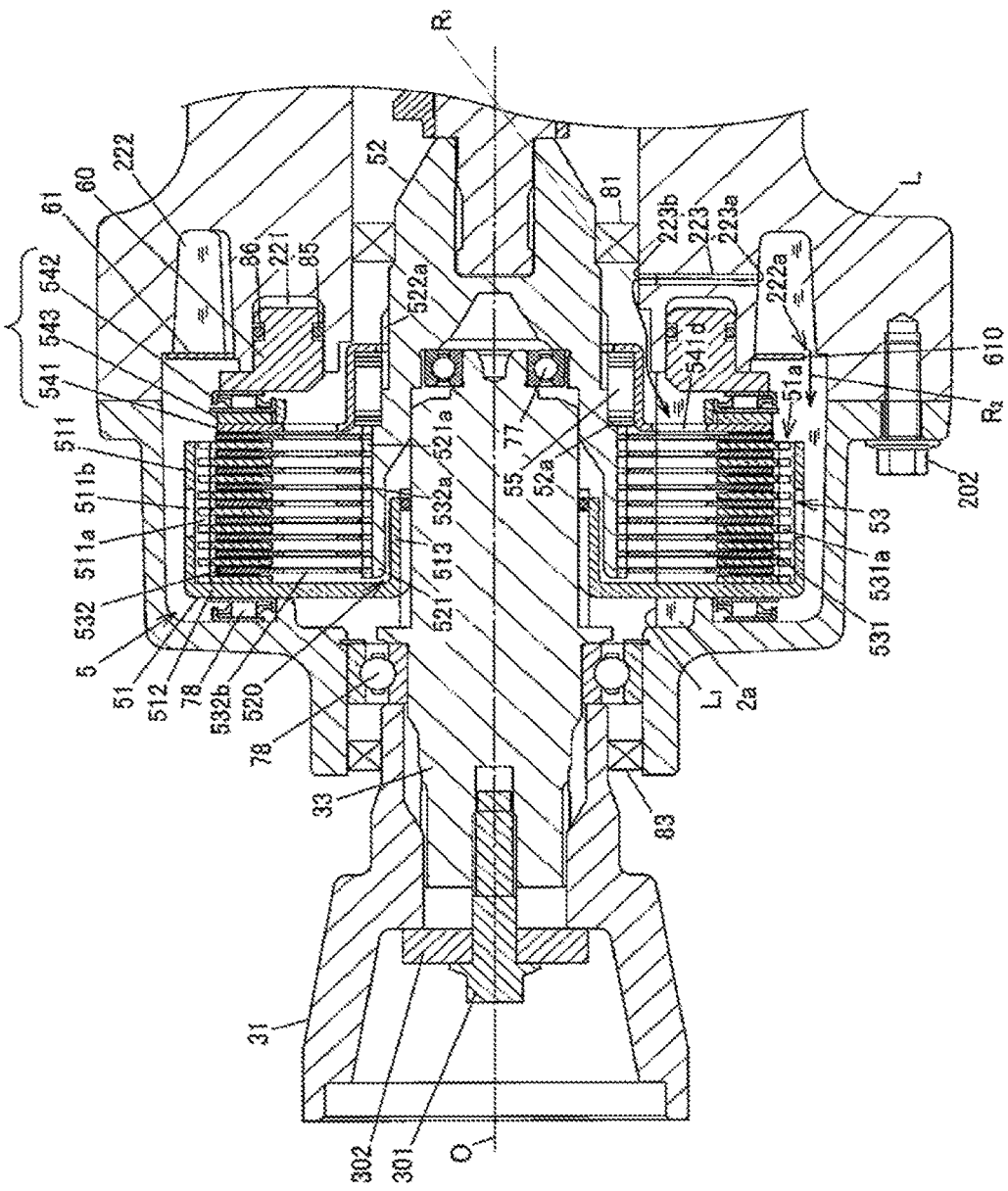
FIG.10 (SECOND EMBODIMENT)

DRIVING FORCE TRANSMITTING APPARATUS

INCORPORATION BY REFERENCE

The disclosure of Japanese Patent Application No. 2015-191684 filed on Sep. 29, 2015 and No. 2015-191683 filed on Sep. 29, 2015 including the specification, drawings and abstract, is incorporated herein by reference in its entirety.

BACKGROUND OF THE INVENTION

1. Field of the Invention

The invention relates to a driving force transmitting apparatus including a friction clutch in which friction sliding between clutch plates is lubricated with a lubricant.

2. Description of the Related Art

A driving force transmitting apparatus has been known which is, for example, mounted in a four-wheel drive vehicle enabling switching between a four-wheel driving state and a two-wheel driving state and which includes a friction clutch in which frictional sliding between clutch plates is lubricated with a lubricant (see, for example, Japanese Patent Application Publication No. 2009-269605 (JP 2009-269605 A).

The driving force transmitting apparatus (final drive unit) described in JP 2009-269605 A includes an outer plate carrier and an inner plate carrier that can rotate on the same rotation axis relative to each other, a friction clutch arranged between the outer plate carrier and the inner plate carrier, and a housing cover that houses the outer plate carrier and the inner plate carrier.

The friction clutch is a wet multi-disc clutch having a plurality of outer plates that rotates along with the outer plate carrier and a plurality of inner plates that rotates along with the inner plate carrier. Frictional sliding between the plates is lubricated with a lubricant.

In the four-wheel drive vehicle described in JP 2009-269605 A, during the two-wheel driving, torque transmission to a propeller shaft (intermediate shaft) that transmits a driving force in a front-rear direction of the vehicle is blocked in a switching apparatus located on a front side of the vehicle and in a driving-force transmitting apparatus located on a rear side of the vehicle. Consequently, during the two-wheel driving, even while the vehicle is traveling, rotation of the propeller shaft is stopped, suppressing traveling loads resulting from rotational resistance of the propeller shaft. Thus, fuel economy performance is improved.

During the four-wheel driving when the driving force of an engine is transmitted to the rear side through the propeller shaft, a lubricant is fed to between the set of the outer plates and the set of the inner plates in the friction clutch. Thus, the lubricant pumped up from an oil pan as a result of rotation of the outer plate carrier passes through an oil receiving pocket and an oil guide hole formed in a housing cover, and reaches the inner plate carrier. The lubricant having reached the inner plate carrier is fed to between the set of the outer plates and the set of the inner plates due to a centrifugal force.

In the driving force transmitting apparatus described in JP 2009-269605 A, during the four-wheel driving, the lubricant is pumped up from the oil pan as a result of rotation of the outer plate carrier. Thus, the rotational resistance of the outer plate carrier increases particularly when the vehicle travels at high speed. If the driving force transmitting apparatus described in JP 2009-269605 A is applied to a four-wheel drive vehicle in which the rotation of the propeller shaft is not stopped during the two-wheel driving, more than a needed amount of lubricant is fed to between the set of the outer plates and the set of the inner plates. Then, a drag torque resulting from the viscosity of the lubricant increases the rotational resistance, degrading fuel economy.

SUMMARY OF THE INVENTION

An object of the invention is to provide a driving force transmitting apparatus that enables rotational resistance of rotating members to be suppressed while sufficiently supplying lubricant to a friction clutch.

A driving force transmitting apparatus in an aspect of the invention includes a first rotating member having a cylindrical portion, a shaft-shaped second rotating member that is rotatable coaxially with and relative to the first rotating member, a friction clutch having a first clutch plate that rotates along with the first rotating member and a second clutch plate that rotates along with the second rotating member, frictional sliding portions of the first clutch plate and the second clutch plate being lubricated with a lubricant, a pressing member that moves in a direction of a rotation axis of the first rotating member and the second rotating member to press the friction clutch, and a housing in which a housing chamber for housing the friction clutch is formed and in which a storage chamber for storing the lubricant scooped up by rotation of the first rotating member is also formed. The lubricant stored in the storage chamber returns to the housing chamber through an inner circulation path leading to inside the first rotating member and an outer circulation path leading to outside the first rotating member.

The driving force transmitting apparatus according to the invention enables rotational resistance of rotating members to be suppressed while sufficiently supplying lubricant to a friction clutch.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 7 is a plan view of a second housing member according to a modification of a first embodiment as seen from the first housing chamber;

FIG. 8 is a plan view depicting a partition wall member according to the modification of the first embodiment;

FIG. 10 is a sectional view depicting an important part of the driving force transmitting apparatus according to the second embodiment.

DETAILED DESCRIPTION OF EMBODIMENTS

Figure 1:
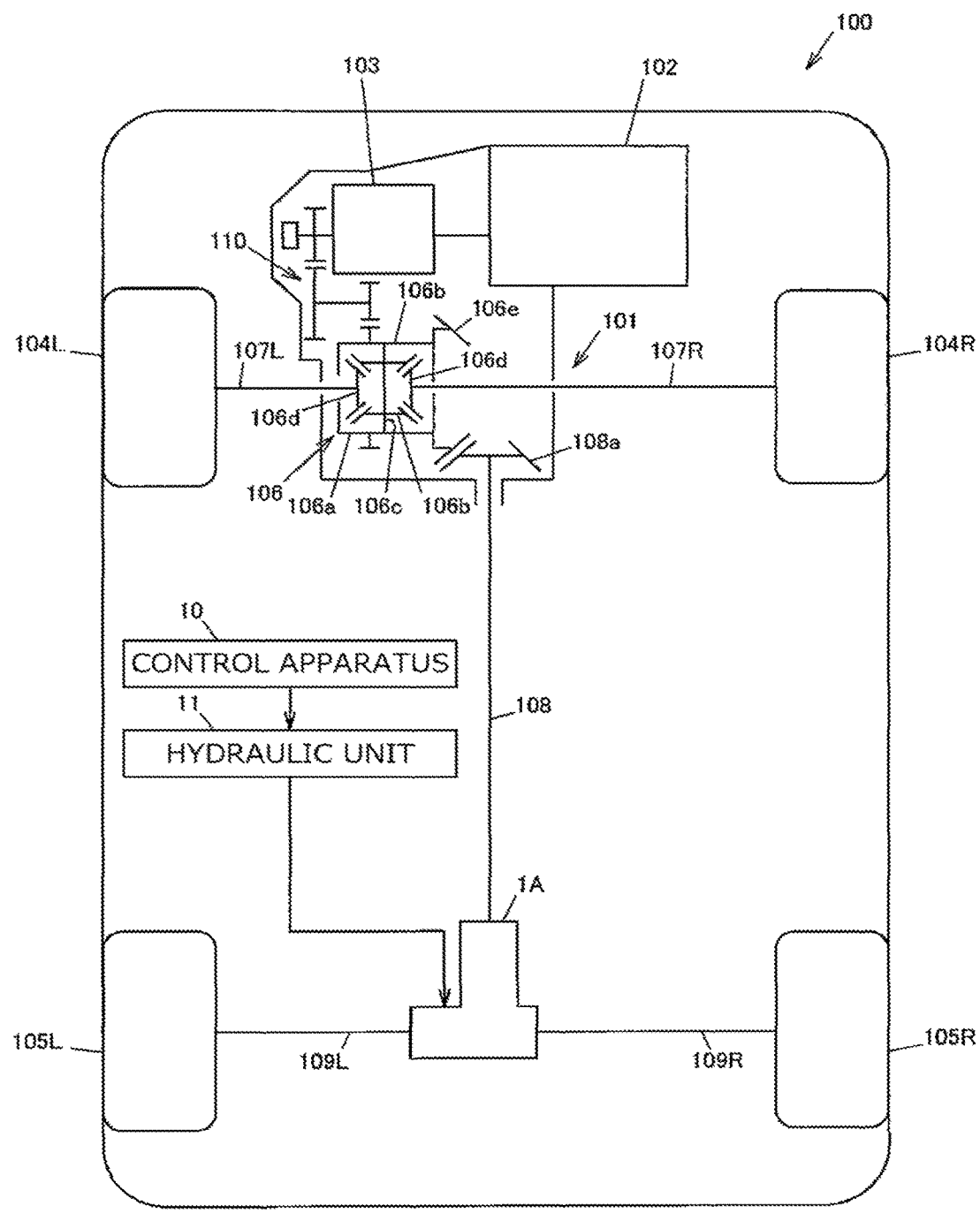
FIG. 1 is a configuration diagram depicting a configuration example of a four-wheel drive vehicle in which a driving force transmitting apparatus according to a first embodiment of the invention is mounted.

Embodiments of the invention will be described below with reference to the attached drawings. FIG. 1 is a configuration diagram depicting a configuration example of a four-wheel drive vehicle in which a driving force transmitting apparatus according to a first embodiment of the invention is mounted.

A four-wheel drive vehicle 100 includes an engine 102 serving as a driving source that generates a driving force for traveling, a transmission 103, front wheels 104R and 104L serving as a lateral pair of main driving wheels, rear wheels 105R and 105L serving as a lateral pair of auxiliary driving wheels, a driving force transmitting system 101 that enables the driving force of the engine 102 to be transmitted to the front wheels 104R and 104L and the rear wheels 105R and 105L, a control apparatus 10, and a hydraulic unit 11. In the present embodiment, R and L in reference numerals are used to mean a right side and a left side with respect to a forward direction of the vehicle.

The four-wheel drive vehicle 100 enables switching between a four-wheel driving state where the driving force of the engine 102 is transmitted to the front wheels 104R and 104L and the rear wheels 105R and 105L and a two-wheel driving state where the driving force of the engine 102 is transmitted only to the front wheels 104R and 104L. In the description of the present embodiment, the engine, which is an internal combustion engine, is applied as a driving source. However, the invention is not limited to this. The driving source may include a combination of an engine and a high-power electric motor such as an interior permanent magnet (IPM) synchronous motor or may include only a high-power electric motor.

The driving force transmitting system 101 has a driving force transmitting apparatus 1A, a front differential 106, a front-wheel drive shafts 107R and 107L, a propeller shaft 108, and rear-wheel drive shafts 109R and 109L. The driving force transmitting apparatus 1A is arranged between the propeller shaft 108 and each of the rear-wheel drive shafts 109R and 109L.

The front differential 106 has a differential case 106a, a pinion shaft 106b supported by the differential case 106a, a pair of pinion gears 106c pivotally supported by the pinion shaft 106b, and a pair of side gears 106d that meshes with the pinion gears 106c such that a gear axis of the side gears 106d is orthogonal to a gear axis of the pinion gears 106c. To the differential case 106a, a driving force output from a transmission 103 via a gear mechanism 110 is transmitted.

The propeller shaft 108 has a gear portion 108a at its one end away from the driving force transmitting apparatus 1A (on a front side). The gear portion 108a meshes with a ring gear 106e that rotates integrally with the differential case 106a. Consequently, the driving force of the engine 102 is constantly transmitted to the propeller shaft 108 regardless of whether the four-wheel drive vehicle 100 is in the two-wheel driving state or in the four-wheel drive state. The speed of the vehicle is varied in accordance with the gear ratio between the ring gear 106e and the gear portion 108a.

The driving force distributed by the front differential 106 is transmitted to the front wheels 104R and 104L via the front-wheel drive shafts 107R and 107L, respectively. The driving force transmitted via the propeller shaft 108 during the four-wheel driving is transmitted to the rear wheels 105R and 105L via the rear-wheel drive shafts 109R and 109L, respectively. During the two-wheel driving, the driving force transmitting apparatus 1A blocks transmission of the driving force to the rear-wheel drive shafts 109R and 109L through the propeller shaft 108.

The hydraulic unit 11 is controlled by the control apparatus 10 and supplies hydraulic oil to the driving force transmitting apparatus 1A. The driving force transmitting apparatus 1A is actuated by the pressure of the hydraulic oil to transmit the driving force to the rear-wheel drive shafts 109R and 109L through the propeller shaft 108.

Figure 2:
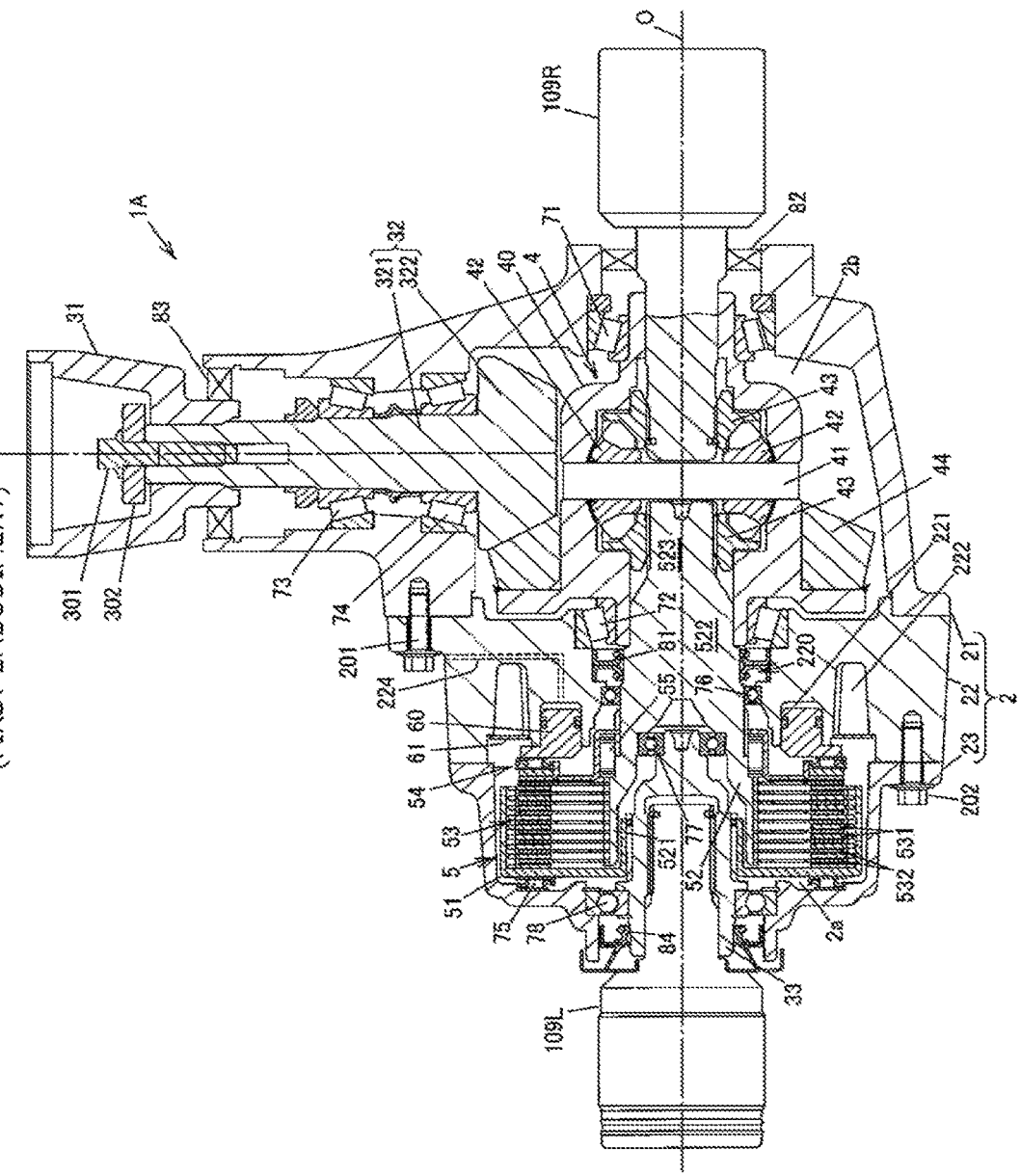
FIG. 2 is a sectional view depicting a configuration example of the driving force transmitting apparatus in a horizontal section.
Figure 3:
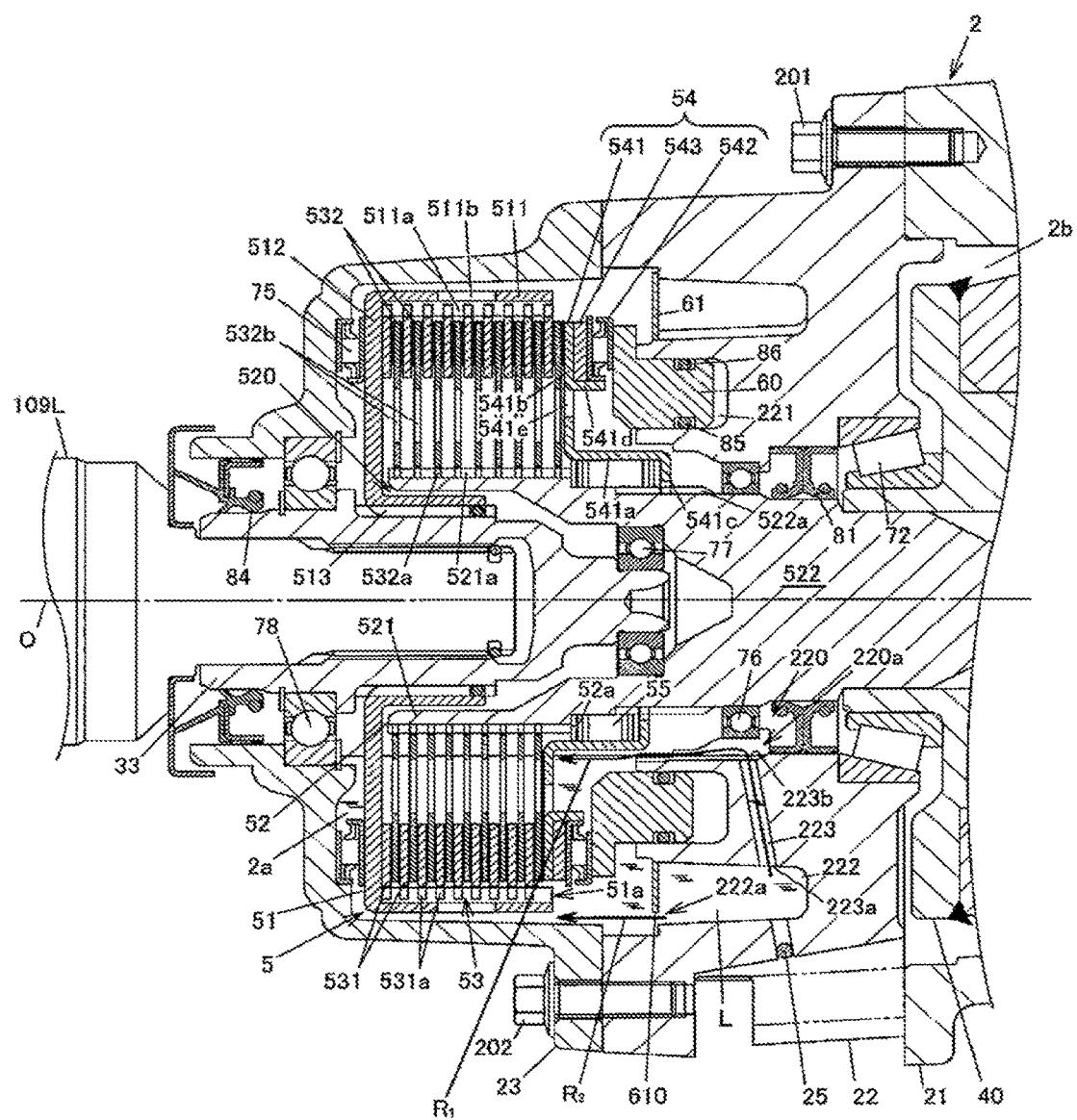
FIG. 3 is a sectional view depicting an important part of the driving force transmitting apparatus in a vertical section.

FIG. 2 is a sectional view depicting a configuration example of the driving force transmitting apparatus 1A in a horizontal section. FIG. 3 is a sectional view depicting an important part of the driving force transmitting apparatus 1A in a vertical section. An upper side of FIG. 3 corresponds to an upper side in the vertical direction when the driving force transmitting apparatus 1A is mounted in the four-wheel drive vehicle 100. A lower side of FIG. 3 corresponds to a lower side in the vertical direction when the driving force transmitting apparatus 1A is mounted in the four-wheel drive vehicle 100.

The driving force transmitting apparatus 1A includes a housing 2 including first to third housing members 21 to 23, a coupling member 31 to which the propeller shaft 108 is coupled, a pinion gear shaft 32 that rotates integrally with the coupling member 31, a differential apparatus 4 that outputs the driving force transmitted to the differential apparatus 4 through the pinion gear shaft 32, through a pair of side gears 43 and 43 with a differential operation permitted, a coupling shaft 33 to which the drive shaft 109L is coupled so as to rotate integrally with the coupling shaft 33, a clutch apparatus 5 that adjusts the driving force transmitted to the coupling shaft 33 through a first side gear 43 included in the pair of side gears 43 and 43 of the differential apparatus 4, and a piston 60 that is operated by the pressure of the hydraulic oil fed from the hydraulic unit 11. The piston 60 is an aspect of a pressing member in the invention.

The differential apparatus 4 has a differential case 40, a pinion shaft 41 supported by the differential case 40, a pair of pinion gears 42 pivotally supported by the pinion shaft 41, the pair of side gears 43 and 43 that meshes with the pinion gears 42 such that a gear axis of the side gears 43 and 43 is orthogonal to a gear axis of the pinion gears 42, and a ring gear 44 that rotates integrally with the differential case 40. The differential case 40 is rotatably supported at opposite ends thereof in a vehicle width direction by tapered roller bearings 71 and 72. The coupling shaft 33 is coupled to the first side gear 43 included in the pair of side gears 43 and 43, so as to be non-rotatable relative to the first side gear 43. The drive shaft 109R is coupled to the other side gear 43 so as to be non-rotatable relative to the other side gear 43. FIG. 2 depicts an outer race of a constant velocity joint arranged at ends of the rear-wheel drive shafts 109R and 109L.

The driving force transmitting apparatus 1A distributes the driving force of the engine 102 transmitted to the driving force transmitting apparatus 1A through the propeller shaft 108, between the rear-wheel drive shafts 109R and 109L with a differential operation therebetween permitted. A clutch apparatus 5 is arranged between the first side gear 43 and the coupling shaft 33. While the four-wheel drive vehicle 100 is traveling straight ahead, when the driving force transmitted to the drive shaft 109L through the first side gear 43 via the coupling shaft 33 is adjusted via the clutch apparatus 5, a differential function of the differential apparatus 4 allows a driving force equivalent to the driving force transmitted to the drive shaft 109L to be transmitted to the drive shaft 109R.

The housing 2 has a first housing member 21 that houses the pinion gear shaft 32 and the differential apparatus 4, a second housing member 22 joined to the first housing member 21 with a plurality of bolts 201, and a third housing member 23 joined to the second housing member 22 with a plurality of bolts 202. For the bolts 201 and the bolts 202, FIG. 2 depicts only one bolt for each type.

The coupling member 31 and the pinion gear shaft 32 are coupled together using a bolt 301 and a washer 302. The pinion gear shaft 32 has a shaft portion 321 and a gear portion 322. The shaft portion 321 is rotatably supported by the tapered roller bearings 73 and 74. The gear portion 322 meshes with the ring gear 44 of the differential apparatus 4.

In the housing 2, a first housing chamber 2a that houses a friction clutch 53, described below, of the clutch apparatus 5 and a second housing chamber 2b that houses the pinion gear shaft 32 and the differential apparatus 4 are defined by a seal member 81 fixed to an inner surface of a shaft hole 220 formed in a central portion of the second housing member 22. In the first housing chamber 2a, a lubricant L (depicted in FIG. 3) is sealed which lubricates frictional sliding portions of a plurality of outer clutch plates 531 and a plurality of inner clutch plates 532 of the friction clutch 53. The frictional sliding portions of the outer clutch plates 531 and the frictional sliding portions of the inner clutch plates 532 frictionally slide on one another. In the second housing chamber 2b, differential oil (not depicted in the drawings) is sealed which has a viscosity suitable for lubrication of gears.

In the first housing member 21, a seal member 82 is fitted on an inner surface of an insertion hole through which the drive shaft 109R is inserted, and a seal member 83 is fitted on an inner surface of an insertion hole through which the coupling member 31 and the pinion gear shaft 32 are inserted. In the third housing member 23, a seal member 84 is fitted on an inner surface of an insertion hole through which the coupling shaft 33 is inserted.

The clutch apparatus 5 has a clutch drum 51 serving as a first rotating member to rotate integrally with the coupling shaft 33, a shaft-like inner shaft 52 serving as a second rotating member to rotate integrally with the first side gear 43, included in the pair of side gears 43 and 43 of the differential apparatus 4, the friction clutch 53 that transmits the driving force between the clutch drum 51 and the inner shaft 52, and a pressing force transmitting mechanism 54 that transmits a pressing force of the piston 60 to the friction clutch 53. The inner shaft 52 is coaxial with the coupling shaft 33 and the clutch drum 51 and is rotatable relative to the coupling shaft 33 and the clutch drum 51. That is, the inner shaft 52, the coupling shaft 33, and the clutch drum 51 share a rotation axis O. A direction parallel to the rotation axis O is hereinafter referred to as an axial direction.

The friction clutch 53 has the outer clutch plates 531 serving as a plurality of first clutch plates to rotate along with the clutch drum 51 and the inner clutch plates 532 serving as a plurality of second clutch plates to rotate along with the inner shaft 52. In the present embodiment, the friction clutch 53 has nine outer clutch plates 531 and nine inner clutch plates 532, and the outer clutch plates 531 and the inner clutch plates 532 are alternately arranged along the axial direction.

The friction clutch 53 receives the pressing force of the piston 60 via the pressing force transmitting mechanism 54 to generate a friction force between the plurality of outer clutch plates 531 and the plurality of inner clutch plates 532. The friction force allows the driving force to be transmitted. The piston 60 is annular around the rotation axis O.

As depicted in FIG. 3, the pressing force transmitting mechanism 54 has an annular slide member 541 coupled to the inner shaft 52 so as to be non-rotatable relative to the inner shaft 52, a thrust needle roller bearing 542, and an adjustment member 543 that is annularly formed to have a predetermined thickness so as to adjust the position of the pressing force transmitting mechanism 54 in the direction of the rotation axis O. The slide member 541 integrally has a cylindrical portion 541a through which the inner shaft 52 is inserted, an outer flange portion 541b formed to protrude radially outward from one axial end of the cylindrical portion 541a, an inner flange portion 541c formed to protrude radially inward from the other axial end of the cylindrical portion 541a, and a holding portion 541d formed to protrude from the outer flange portion 541b toward the piston 60.

The thrust needle roller bearing 542 and the adjustment member 543 have respective annual bore diameter portions supported in the radial direction by the holding portion 541d. A bias member 55 is arranged between the cylindrical portion 541a and an outer peripheral surface of the inner shaft 52. The bias member 55 is an elastic body, for example, a spring and is in abutting contact with a step surface 52a formed on the inner shaft 52 at one axial end of the bias member 55 and with the inner flange portion 541c of the slide member 541 at the other end of the slide member 541. The bias member 55, compressed in the axial direction, is arranged between the step surface 52a and the inner flange portion 541c. The bias member 55 exerts a restoration force to bias the slide member 541 away from the friction clutch 53.

The clutch drum 51 integrally has a cylindrical portion 511, a bottom wall portion 512, and a coupling portion 513. The cylindrical portion 511 is shaped like a cylinder and has a spline fitting portion 511a formed on its inner peripheral surface and including a plurality of spline protrusions. The bottom wall portion 512 extends inward from an end of the cylindrical portion 511. The coupling portion 513 extends from an inner peripheral end of the bottom wall portion 512 along an outer peripheral surface of the coupling shaft 33. The clutch drum 51 has an opening 51a on the piston 60 side. The friction clutch 53 is arranged inside the cylindrical portion 511. A thrust roller bearing 75 is arranged between the bottom wall portion 512 and an inner surface of the third housing member 23 to regulate movement of the clutch drum 51 in the axial direction. The coupling portion 513 is coupled to the coupling shaft 33 by spline fitting so as not to be rotatable relative to the coupling shaft 33.

One end of the inner shaft 52 in the axial direction is housed in the cylindrical portion 511 of the clutch drum 51. The inner shaft 52 integrally has a large diameter portion 521 arranged inside the cylindrical portion 511 of the clutch drum 51, a medium diameter portion 522 having a smaller outer side diameter than the large diameter portion 521, and a small diameter portion 523 coupled to the first side gear 43 so as to be non-rotatable relative to the first side gear 43. The step surface 52a with which one end of the bias member 55 is in abutting contact is formed between the large diameter portion 521 and the medium diameter portion 522. The inner shaft 52 is inserted through the shaft hole 220 in the second housing member 22. A ball bearing 76 is arranged between an outer peripheral surface of the inner shaft 52 and an inner peripheral surface of the shaft hole 220.

The inner shaft 52 has a first spline fitting portion 521a formed on an outer peripheral surface of the large diameter portion 521 and a second spline fitting portion 522a formed on an outer peripheral surface of the medium diameter portion 522. Each of the first spline fitting portion 521a and the second spline fitting portion 522a includes a plurality of spline protrusions extending in the axial direction. The inner flange portion 541c of the slide member 541 is fitted in the second spline fitting portion 522a.

The outer clutch plates 531 have a plurality of protrusions 531a formed at outer peripheral ends of the respective outer clutch plates 531 to engage with the spline fitting portion 511a formed on the inner peripheral surface of the cylindrical portion 511 of the clutch drum 51. Consequently, the outer clutch plates 531 are coupled to the clutch drum 51 so as to be movable in the axial direction and to be non-rotatable, relative to the clutch drum 51. The inner clutch plates 532 have a plurality of protrusions 532a formed at inner peripheral ends of the respective inner clutch plates 532 to engage with the first spline fitting portion 521a formed on the outer peripheral surface of the large diameter portion 521 of the inner shaft 52. Consequently, the inner clutch plates 532 are coupled to the inner shaft 52 so as to be movable in the axial direction and to be non-rotatable, relative to the inner shaft 52.

An outer peripheral part of each of the inner clutch plates 532 frictionally slides on the corresponding outer clutch plates 531. A plurality of lubrication holes 532b through which the lubricant L flows is formed in a portion of each of the inner clutch plates 532, which is located inward of the corresponding outer clutch plate 531. In the outer flange portion 541b of the slide member 541, a plurality of lubrication holes 531e is also formed through which the lubricant L flows. The lubricant L fed through the opening 51a in the clutch drum 51 via the lubrication holes 532b and 541e passes between the outer clutch plates 531 and the inner clutch plates 532 due to centrifugal force and is then discharged outward through a plurality of discharge holes 511b formed in the cylindrical portion 511 of the clutch drum 51.

In a central portion of the inner shaft 52, a housing hole 520 is formed in which the coupling portion 513 of the clutch drum 51 and a part of the coupling shaft 33 are housed. The housing hole 520 is formed to extend from an end of the large diameter portion 521 of the inner shaft 52 over a part of the medium diameter portion 522 in the axial direction. The coupling shaft 33 is rotatably supported by a ball bearing 77 arranged between the coupling shaft 33 and an inner surface of the housing hole 520 and a ball bearing 78 arranged between the coupling shaft 33 and the third housing member 23.

Figure 4A:
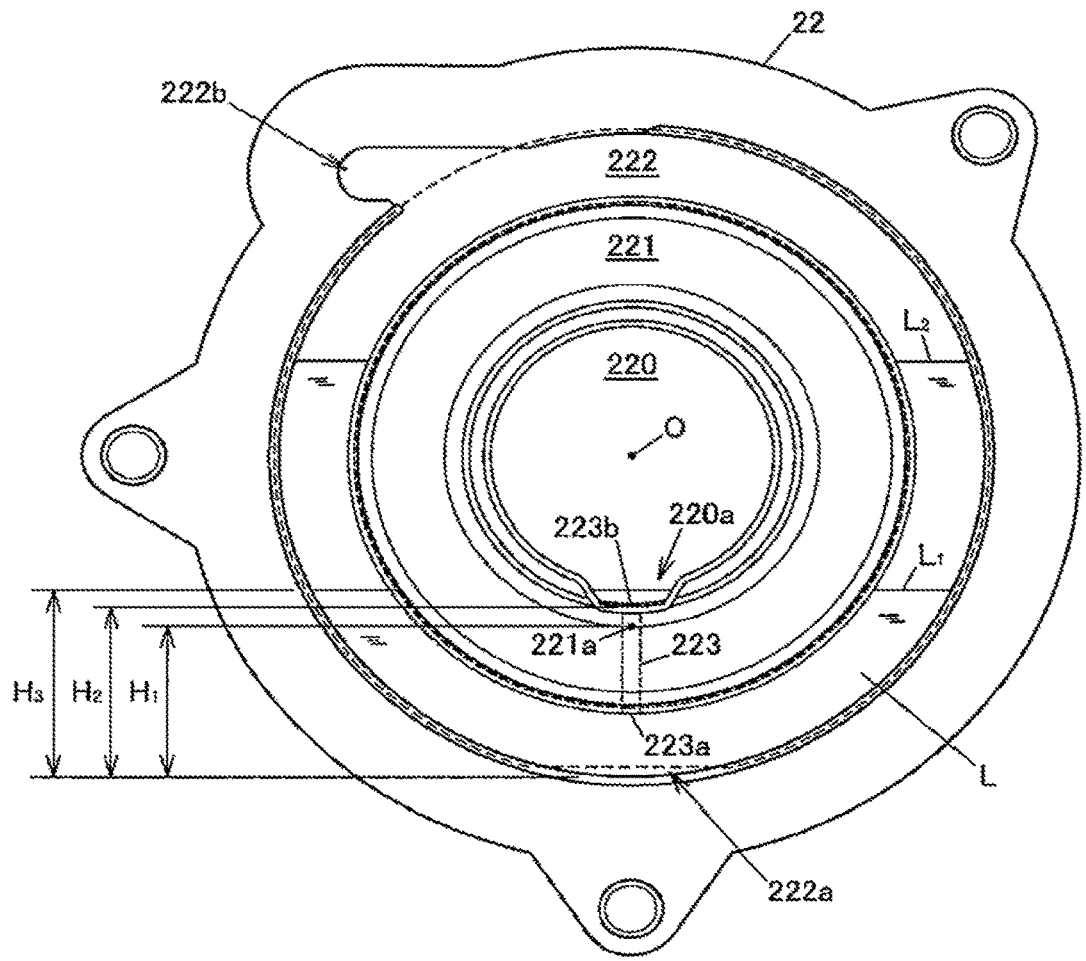
FIG. 4A is a plan view of a second housing member as seen from a first housing chamber.
Figure 4B:
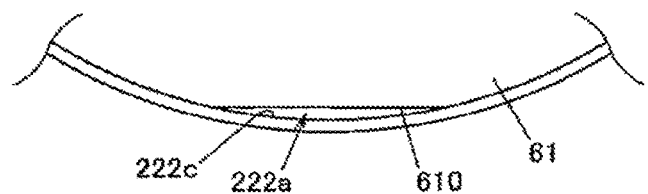
FIG. 4B is an enlarged view depicting a lower end of a storage chamber formed in the second housing member, along with a partition wall member.
Figure 5:
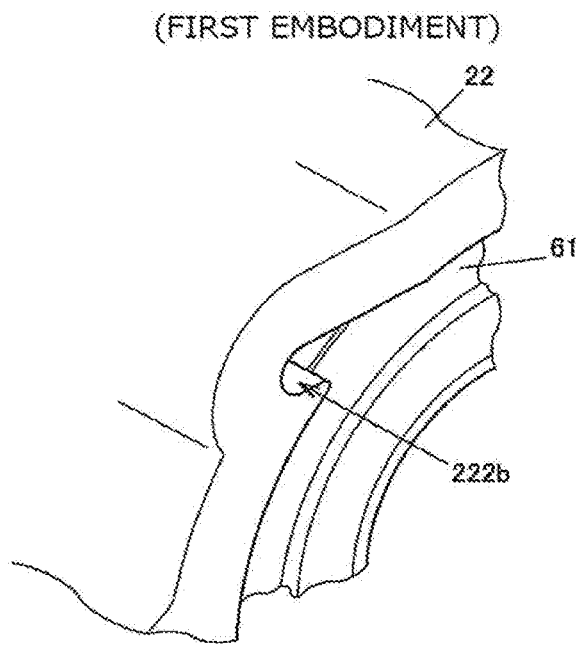
FIG. 5 is a perspective view depicting an inlet port that is formed in the second housing member and through which a lubricant flows into the storage chamber.
Figure 6:
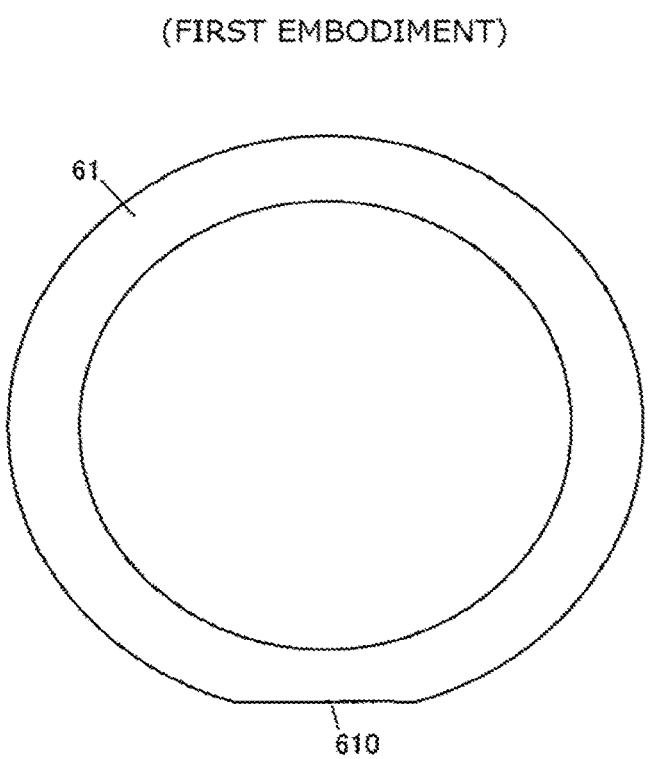
FIG. 6 is a plan view depicting a partition wall member.

FIG. 4A is a plan view of the second housing member 22 as seen from the first housing chamber 2a. FIG. 4B is an enlarged view of a lower end of a storage chamber 222 formed in the second housing member 22, along with a partition wall member 61 described below. FIG. 5 is a perspective view depicting an inlet port 222b that is formed in the second housing member 22 and through which the lubricant L flows to the storage chamber 222. FIG. 6 is a plan view depicting the partition wall member 61. An upper side of each of FIGS. 4A, 4B, and 6 corresponds to the upper side in the vertical direction when the driving force transmitting apparatus 1A is mounted in the four-wheel drive vehicle 100. A lower side of each of FIGS. 4A, 4B, and 6 corresponds to the lower side in the vertical direction when the driving force transmitting apparatus 1A is mounted in the four-wheel drive vehicle 100.

The second housing member 22 is provided with an annular cylinder chamber 221 to which hydraulic oil applying hydraulic pressure to the piston 60 to move the piston 60 toward the friction clutch 53 is supplied, the storage chamber 222 in which the lubricant L scooped up by rotation of the clutch drum 51 is stored, a lubricant supply hole 223 that allows the lubricant L stored in the storage chamber 222 to be fed from inside the piston 60 to the first housing chamber 2a, and a hydraulic-oil supply hole 224 (see FIG. 2) through which the hydraulic oil is fed to the cylinder chamber 221. In FIG. 4A, the lubricant supply hole 223 is depicted by a dashed line.

The cylinder chamber 221 and the storage chamber 222 are shaped like circular rings formed concentrically around the rotation axis O. The storage chamber 222 is arranged radially outward of the cylinder chamber 221. The cylinder chamber 221 is arranged radially outward of the shaft hole 220 through which the inner shaft 52 is inserted. Both the cylinder chamber 221 and the storage chamber 222 are formed as recessed portions that are open to the first housing chamber 2a and that are recessed in the direction of the rotation axis O from the first housing chamber 2a toward the second housing chamber 2b. A part of the opening of the recessed portion of the storage chamber 222 is closed by the annular partition wall member 61.

Hydraulic oil is fed from the hydraulic unit 11 to the cylinder chamber 221 via the hydraulic-oil supply hole 224. The piston 60, with a part thereof arranged in the cylinder chamber 221, is movable forward and backward in the direction of the rotation axis O. The piston 60 is moved toward the first housing chamber 2a by the hydraulic pressure of the hydraulic oil to press the friction clutch 53. When the pressure of the hydraulic oil decreases, the piston 60 is moved toward an inner side of the cylinder chamber 221 by the bias force of the bias member 55, to which the piston 60 is subjected via the pressing force transmitting mechanism 54. The piston 60 is thus separated from the friction clutch 53. A circumferential groove is formed in each of an inner and an outer circumferential surfaces of the piston 60. O rings 85 and 86 are held in the respective circumferential grooves. The O rings 85 and 86 slide on an inner surface of the cylinder chamber 221 in conjunction with forward and backward movement of the piston 60.

In FIG. 4A, an outer edge and an inner edge of the partition wall member 61 fixed to the second housing member 22 are shown by dashed lines. During forward traveling of the four-wheel drive vehicle 100, the clutch drum 51 rotates counterclockwise in FIG. 4A. In FIG. 4A, an oil level at which the lubricant L is located while the four-wheel drive vehicle 100 is stopped with rotation of the clutch drum 51 and the inner shaft 52 stopped is denoted by reference numeral $L_1$. The oil level at which the lubricant L is located while the four-wheel drive vehicle 100 is traveling at a high speed is denoted by reference numeral $L_2$.

The partition wall member 61 is formed of plate-like metal and its inner peripheral end is fixed to the second housing member 22 at an outer peripheral end of the partition wall member 61 by fixing means such as welding or clinching. A cutout 610 is formed at a lower end of the partition wall member 61 as depicted in FIG. 6. In the present embodiment, the cutout 610 is formed by cutting an outer-peripheral lower end of the partition wall member 61 in the horizontal direction. The cutout 610 forms, at a lower end of the storage chamber 222, a communication hole 222a through which the storage chamber 222 and the first housing chamber 2a communicate with each other. That is, the communication hole 222a is defined by a clearance between the outer peripheral end of the partition wall member 61 and an outer peripheral surface 222c of the storage chamber 222 at a lower end thereof (depicted in FIG. 4B).

At an upper end of the storage chamber 222, the inlet port 222b is formed through which the lubricant L scooped up by rotation of the clutch drum 51 flows into the storage chamber 222. In the present embodiment, the opening in the storage chamber 222 projects, at the upper end of the storage chamber 222, with respect to the outer edge of the partition wall member 61 in the horizontal direction to form the inlet port 222b. The direction of the projection is the direction of rotation of the clutch drum 51 during forward traveling of the four-wheel drive vehicle 100. The lubricant L scooped up by rotation of the clutch drum 51 flows along the inner surface of the first housing chamber 2a and is fed into the storage chamber 222 through the inlet port 222b. The amount of lubricant L stored in the storage chamber 222 increases as the rotation speed of the clutch drum 51 increases. The partition wall member 61 closes the storage chamber 222 except for the communication hole 222a and the inlet port 222b.

The lubricant supply hole 223 extends in an up-down direction and allows the lubricant L to pass a part of the second housing member 22, which is on the opposite side of the cylinder chamber 221 from the first housing chamber 2a (on the second housing chamber 2b side), and to be fed from inside the piston 60 in the radial direction to the first housing chamber 2a. The lubricant supply hole 223 is circular in section that is orthogonal to an extending direction of the lubricant supply hole 223 and is smaller in area than the communication hole 222a.

An introduction port 223a through which the lubricant L is fed into the lubricant supply hole 223 is formed in an inner peripheral surface of the storage chamber 222. A discharge port 223b through which the lubricant L is discharged from the lubricant supply hole 223 is open in the inner surface of the shaft hole 220. In the present embodiment, the introduction port 223a is formed below the discharge port 223b at a lower end of an inner peripheral surface of the storage chamber 222. In other words, the lubricant supply hole 223 has an opening in the inner peripheral surface of the storage chamber 222 and extends from the opening toward the inner surface of the shaft hole 220. The storage chamber 222 and the first housing chamber 2a communicate with each other below the lubricant supply hole 223.

In the present embodiment, the lubricant supply hole 223 is inclined with respect to the vertical direction, and the discharge port 223b is positioned closer to the friction clutch 53 than the introduction port 223a. However, the lubricant supply hole 223 may extend along the vertical direction. In the present embodiment, for facilitation of machining, the lubricant supply hole 223 is linearly formed by closing, with a stopper 25 (see FIG. 3), one end of a hole formed by drilling from an outer surface of the second housing member 22 toward the shaft hole 220. The stopper 25 is a sphere and is plugged into the hole through the outer surface of the second housing member 22.

As depicted in FIG. 4A, the shaft hole 220 is cut at a lower end thereof along the axial direction to form a groove portion 220a. The discharge port 223b of the lubricant supply hole 223 is formed in a bottom surface of the groove portion 220a. The lubricant discharged through the discharge port 223b flows through the groove portion 220a and is fed to the first housing chamber 2a.

The first housing chamber 2a and the storage chamber 222 communicate with each other through the communication hole 222a. Thus, when the clutch drum 51 and the inner shaft 52 are not rotated, the lubricant L in the first housing chamber 2a is identical in oil level to the lubricant L in the storage chamber 222. In the present embodiment, the oil level $L_1$ of the lubricant L when the clutch drum 51 and the inner shaft 52 are not rotated is higher than the lowest point 221a (depicted in FIG. 4A) of the inner peripheral surface of the cylinder chamber 221 and also higher than the discharge port 223b.

As depicted in FIG. 4A, with reference to the bottom portion of the storage chamber 222 in the vertical direction, the height of the lowest point 221a of the inner peripheral surface of the cylinder chamber 221 is designated as $H_1$, the height of the discharge port 223b of the lubricant supply hole 223 is designated as $H_2$, and the height of the oil level $L_1$ of the lubricant L is designated as $H_3$. Then, Expression (1) is satisfied.

$$H_3 > H_2 > H_1 \qquad (1)$$

In other words, in the present embodiment, the introduction port 223a of the lubricant supply hole 223, which is located closer to the storage chamber 222, and the discharge port 223b of the lubricant supply hole 223, which is located closer to the first housing chamber 2a, are formed below the oil level $L_1$ of the lubricant L when the clutch drum 51 and the inner shaft 52 are not rotated. In this case, height $H_3$ of the oil level $L_1$ of the lubricant L is the height of the oil level at which the lubricant L is located when the smallest amount of lubricant L is stored in the storage chamber 222 (minimum oil level height).

When the clutch drum 51 rotates, the lubricant L in the first housing chamber 2a is scooped up and flows into the storage chamber 222 through the inlet port 222b, reducing the amount of lubricant L in the first housing chamber 2a and raising the oil level of the lubricant L in the storage chamber 222. Consequently, the pressure of the lubricant L in a lower portion of the storage chamber 222 is elevated to eject the lubricant L through the discharge port 223b of the lubricant supply hole 223. The ejected lubricant L is fed to inside the clutch drum 51 in the first housing chamber 2a via inside the piston 60 and the lubrication hole 541e in the slide member 541.

A portion of the lubricant L stored in the storage chamber 222 is fed to outside the clutch drum 51 in the first housing chamber 2a through outside the piston 60 via the communication hole 222a. The lubricant L fed to the first housing chamber 2a is scooped up by rotation of the clutch drum 51 and flows into the storage chamber 222 through the inlet port 222b. Consequently, during traveling of the four-wheel drive vehicle 100, the lubricant L circulates between the first housing chamber 2a and the storage chamber 222.

In FIG. 3, a path for the lubricant L from the storage chamber 222 to inside the clutch drum 51 via the lubricant supply hole 223 is designated as an inner circulation path $R_1$, and a path for the lubricant L from the storage chamber 222 to outside the clutch drum 51 via the communication hole 222a is designated as an outer circulation path $R_2$. The lubricant L scooped up by the clutch drum 51 and stored in the storage chamber 222 returns to the first housing chamber 2a through the inner circulation path $R_1$ and the outer circulation path $R_2$. The outer circulation path $R_2$ is positioned below the oil level $L_1$ of the lubricant L when the clutch drum 51 and the inner shaft 52 are not rotated.

The inner circulation path $R_1$ includes the lubricant supply hole 223 in the path, and the outer circulation path $R_2$ includes the communication hole 222a in the path, and thus, the ratio between the flow rate of the lubricant L returning to the first housing chamber 2a through the inner circulation path R₁ and the flow rate of the lubricant L returning to the first housing chamber 2a through the outer circulation path R₂ varies according to the channel areas of the lubricant supply hole 223 and the communication hole 222a. In the present embodiment, the channel areas of the lubricant supply hole 223 and the communication hole 222a are set such that the flow rate of the lubricant L returning to the first housing chamber 2a through the inner circulation path R₁ is constantly lower than the flow rate of the lubricant L returning to the first housing chamber 2a through the outer circulation path R₂. The channel area of the communication hole 222a is, for example, four times as large as the channel area of the lubricant supply hole 223.

The lubricant L fed through the opening 51a in the clutch drum 51 via the inner circulation path R₁ flows through the clutch drum 51 toward the bottom wall portion 512 via the lubrication holes 532b in the inner clutch plates 532. The lubricant L lubricates the frictional sliding portions of the inner clutch plates 532 and the outer clutch plates 531 and is then discharged outside through the discharge holes 511b formed in the cylindrical portion 511 of the clutch drum 51.

The above-described first embodiment produces effects described below.

(1) The lubricant L stored in the storage chamber 222 is fed to the first housing chamber 2a through the inner circulation path R₁, which leads to inside the clutch drum 51, and the outer circulation path R₂, which leads to outside the clutch drum 51. Thus, compared to a configuration in which all of the lubricant L stored in the storage chamber 222 is fed to the first housing chamber 2a through the inner circulation path R₁, the present configuration allows suppression of feeding of an excess amount of lubricant L into the clutch drum 51. This enables a reduction in drag torque resulting from the viscosity of the lubricant L.

(2) When the four-wheel drive vehicle 100 steadily travels at a relatively high speed, that is, when the four-wheel drive vehicle 100 travels along an express way, for example, the clutch drum 51 steadily rotates at a high rotation speed to increase the amount of lubricant L scooped up by the clutch drum 51. During such high-speed traveling, much lubricant L is stored in the storage chamber 222 to reduce the amount of lubricant L stagnant in the first housing chamber 2a. This reduces the rotational resistance of the clutch drum 51, which contributes to improvement of fuel economy performance.

(3) The storage chamber 222 is provided radially outward of the cylinder chamber 221 and can thus have a large volume and store a large amount of lubricant L. The lubricant supply hole 223 allows the lubricant L to be fed to the first housing chamber 2a via a part of the second housing member 22, which is on the opposite side of the cylinder chamber 221 from the first housing chamber 2a. Thus, even though the storage chamber 222 is provided radially outward of the cylinder chamber 221, the lubricant L can be fed to the first housing chamber 2a from inside the piston 60 via the inner circulation path R₁.

(4) The inner circulation path R₁ includes the lubricant supply hole 223, through which the lubricant L is fed to the first housing chamber 2a through inside the piston 60. Thus, the lubricant L can be reliably guided to inside the clutch drum 51. The outer circulation path R₂ includes the communication hole 222a, through which the storage chamber 222 and the first housing chamber 2a communicate with each other outside the piston 60. Thus, the lubricant L can be reliably guided to outside the clutch drum 51.

(5) The storage chamber 222 can be easily machined because the opening of the storage chamber 222 on the first housing chamber 2a side is closed by the partition wall member 61, except for the communication hole 222a and the inlet port 222b. The partition wall member can also be easily machined because the communication hole 222a is defined by the clearance between the outer peripheral end of the partition wall member 61 and the outer peripheral surface 222c of the storage chamber 222 at the lower end thereof.

(6) The lubricant supply hole 223 has the introduction port 223a in the inner peripheral surface of the storage chamber 222 and extends from the introduction port 223a toward the inner surface of the shaft hole 220 in the second housing member 22. Thus, the shaft hole 220 can be used as the inner circulation path R₁, facilitating formation of the inner circulation path R₁.

(7) The flow rate of the lubricant L returning to the first housing chamber 2a through the inner circulation path R₁ is lower than the flow rate of the lubricant L returning to the first housing chamber 2a through the outer circulation path R₂. This allows more reliable suppression of feeding of an excess amount of lubricant L into the clutch drum 51, enabling reduction in drag torque resulting from the viscosity of the lubricant L.

(8) The outer circulation path R₂ is positioned below the oil level L₁ of the lubricant L when the clutch drum 51 and the inner shaft 52 are not rotated. Thus, the lubricant L can be constantly supplied to the first housing chamber 2a via the outer circulation path R₂.

Now, a modification of the first embodiment will be described with reference to FIG. 7 and FIG. 8.

FIG. 7 is a plan view of the second housing member 22 according to the modification of the first embodiment as seen from the first housing chamber 2a. FIG. 8 is a plan view depicting the partition wall member 61 according to the modification.

In the first embodiment, the storage chamber 222 is shaped like a circular ring centered around the rotation axis O. In the present modification, the storage chamber 222 is shaped like a circular arc centered around the rotation axis O. The partition wall member 61 that covers a part of the opening in the storage chamber 222 is similarly shaped like a circular arc. In the example illustrated in FIG. 7, the storage chamber 222 is formed to extend 270° starting from an upper side of a vertical line passing through the rotation axis O. The start point and the angle may be set as needed according to the configuration of the second housing member 22.

In the description of the first embodiment, the height H₁ of the lowest point 221a of the inner peripheral surface of the cylinder chamber 221 and the H₂ of the discharge port 223b are lower than the minimum oil level height (the height H₃ of the oil level L₁ of the lubricant). However, in the present modification, the height H₂ of the discharge port 223b is the same as the minimum oil level height.

In other words, in the present modification, Expression (2) is satisfied.

$$H_3 = H_2 > H_1 \qquad (2)$$

In the description of the first embodiment, the communication hole 222a is defined by the cutout 610 of the partition wall member 61. However, in the present modification, the communication hole 222a is defined by a through-hole 611 formed in the partition wall member 61. The through-hole 611 is located between an outer edge 61a and an inner edge 61*b* of the partition wall member 61 so as to be closer to the outer edge 61*a* rather than to the inner edge 61*b*. The through-hole 611 penetrates the partition wall member 61 in a plate thickness direction. In an example illustrated in FIG. 8, one through-hole 611 is formed. However, a plurality of through-holes 611 may be formed. The shape of the through-hole is also not limited to a circle but may be, for example, an ellipse that is long in a circumferential direction or a polygon.

The present modification produces effects similar to the effects of the first embodiment. Furthermore, since the communication hole 222*a* is defined by the through-hole 611 in the partition wall member 61, the partition wall member 61, which allows formation of the outer circulation path $R_2$, can be easily machined.

Now, a driving force transmitting apparatus 1B according to a second embodiment of the invention will be described with reference to FIG. 9 and FIG. 10.

Figure 9:
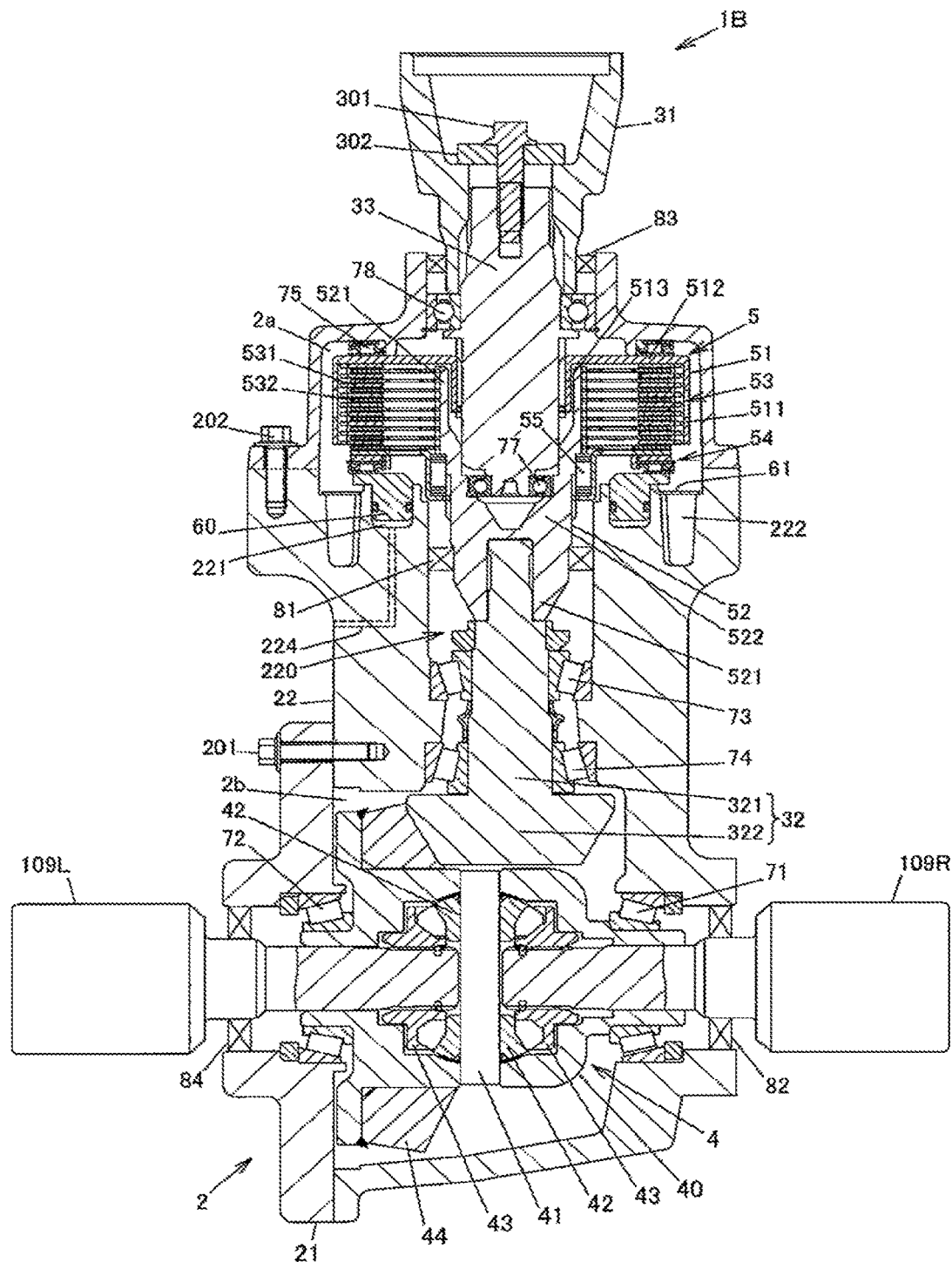
FIG. 9 is a sectional view depicting, in a horizontal section, a configuration example of a driving force transmitting apparatus according to a second embodiment of the invention.

FIG. 9 is a sectional view depicting a configuration example of the driving force transmitting apparatus 1B in a horizontal section. FIG. 10 is a sectional view depicting an important part of the driving force transmitting apparatus 1B in a vertical section. An upper side of FIG. 10 corresponds to the upper side in the vertical direction when the driving force transmitting apparatus 1B is mounted in the four-wheel drive vehicle 100. A lower side of FIG. 10 corresponds to the lower side in the vertical direction when the driving force transmitting apparatus 1B is mounted in the four-wheel drive vehicle 100. Members and the like in FIG. 9 and FIG. 10 that are the same as or correspond to those described in the first embodiment are denoted by the same reference numerals.

The following description focuses on differences in configuration from the driving force transmitting apparatus 1A in the first embodiment. In the description of the driving force transmitting apparatus 1A according to the first embodiment, the clutch apparatus 5 is arranged between the differential apparatus 4 and the drive shaft 109L. However, the driving force transmitting apparatus 1B according to the present embodiment is different from the driving force transmitting apparatus 1A according to the first embodiment mainly in a configuration in which the clutch apparatus 5 is arranged between the propeller shaft 108 and the differential apparatus 4.

Like the driving force transmitting apparatus 1A according to the first embodiment, the driving force transmitting apparatus 1B according to the present embodiment includes the differential apparatus 4 and the clutch apparatus 5 to transmit a driving force to the rear-wheel drive shafts 109R and 109L through the propeller shaft 108. The driving force transmitted to the differential apparatus 4 varies according to a torque transmitted through the friction clutch 53 having the outer clutch plates 531 and the inner clutch plates 532. The torque transmitted through the friction clutch 53 is adjusted by the pressing force of the piston 60 that is subjected to the pressure of the hydraulic oil fed from the hydraulic unit 11.

The differential apparatus 4 is housed in the second housing member 22. The first housing member 21 closes the opening of the second housing member 22 and defines the second housing chamber 2*b* for the differential apparatus 4 and the pinion gear shaft 32 along with the second housing member 22. The gear portion 322 of the pinion gear shaft 32 meshes with the ring gear 44 of the differential apparatus 4. The shaft portion 321 of the pinion gear shaft 32 is coupled to the inner shaft 52 by spline fitting so as to rotate integrally with the inner shaft 52. The pinion gear shaft 32 and the inner shaft 52 are coupled together in the shaft hole 220 formed in a central portion of the second housing member 22.

The clutch drum 51 is housed in the third housing member 23 and rotates integrally with the coupling shaft 33. The coupling shaft 33 is coupled via the bolt 301 and the washer 302 to the coupling member 31, to which the propeller shaft 108 is coupled, such that the coupling shaft 33 rotates integrally with the coupling member 31. The outer clutch plates 531 are coupled to the clutch drum 51 so as to be movable in the axial direction and to be non-rotatable relative to the clutch drum 51. The inner clutch plates 532 are coupled to the inner shaft 52 so as to be movable in the axial direction and to be non-rotatable relative to the inner shaft 52. The frictional sliding portions of the outer clutch plates 531 and the inner clutch plates 532 are lubricated with the lubricant L supplied to the first housing chamber 2*a*.

As is the case with the first embodiment, the second housing member 22 is provided with the annular cylinder chamber 221 to which hydraulic oil applying hydraulic pressure to the piston 60 to move the piston 60 toward the friction clutch 53 is supplied, the storage chamber 222 in which the lubricant L scooped up by rotation of the clutch drum 51 is stored, the lubricant supply hole 223 which allows the lubricant L stored in the storage chamber 222 to be fed to the first housing chamber 2*a* from inside the piston 60, and the hydraulic-oil supply hole 224 (see FIG. 9) through which the hydraulic oil is fed to the cylinder chamber 221.

The lubricant L stored in the storage chamber 222 returns to the first housing chamber 2*a* through the inner circulation path $R_1$ and the outer circulation path $R_2$. The inner circulation path $R_1$ is a path for the lubricant L extending from the storage chamber 222 to inside the clutch drum 51 via the lubricant supply hole 223. The outer circulation path $R_2$ is a path for the lubricant L extending from the storage chamber 222 to outside the clutch drum 51 via the lubricant supply hole 223. The outer circulation path $R_2$ is positioned below the oil level $L_1$ of the lubricant L when the clutch drum 51 and the inner shaft 52 are not rotated.

The channel areas of the lubricant supply hole 223 and the communication hole 222*a* are set such that the flow rate of the lubricant L returning to the first housing chamber 2*a* through the inner circulation path $R_1$ is constantly lower than the flow rate of the lubricant L returning to the first housing chamber 2*a* through the outer circulation path $R_2$. The amount of the lubricant L is adjusted such that the oil level $L_1$ of the lubricant L when the clutch drum 51 and the inner shaft 52 are not rotated is higher than the lowest point of the inner peripheral surface of the cylinder chamber 221 and lower than the discharge port 223*b*. However, the amount of the lubricant L may be adjusted such that the oil level $L_1$ of the lubricant L is located at the same height as that of the discharge port 223*b* or higher than the discharge port 223*b*.

Both the cylinder chamber 221 and the storage chamber 222 are formed as recessed portions that are open to the first housing chamber 2*a* and that are recessed in the direction of the rotation axis O from the first housing chamber 2*a* toward the second housing chamber 2*b*. In the present embodiment, the storage chamber 222 is shaped like a circular ring and provided radially outward of the cylinder chamber 221. However, the storage chamber 222 may be shaped like a circular arc and provided radially outward of the cylinder chamber 221. In the present embodiment, the communication hole 222*a* is defined by the cutout 610 formed at the lower end of the circular-ring-shaped partition wall member 61. However, the communication hole 222*a* may be defined by the through-hole 611 formed in the partition wall member 61 as in the modification depicted in FIG. 8.

The present embodiment can also produce effects similar to the effects of the first embodiment. For example, the configuration of the driving force transmitting system 101 in the four-wheel drive vehicle 100 is not limited to the configuration illustrated in FIG. 1 but any of various configurations may be adopted.

In the above-described embodiments, the friction clutch 53 is pressed by the piston 60 that is moved by the hydraulic pressure of the hydraulic oil. However, the invention is not limited to this. The friction clutch 53 may be pressed by a cam mechanism that is rotationally driven by a motor different from the driving source or a pressing member that is moved in the axial direction via a cam mechanism by a magnetic flux generated by an electromagnetic solenoid.

The driving force transmitting apparatus has been described based on the embodiments. However, the configuration of the driving force transmitting system 101 in the four-wheel drive vehicle 100 is not limited to the configuration illustrated in FIG. 1. Any of various configurations may be adopted for the driving force transmitting system 101.

The invention claimed is:

1. A driving force transmitting apparatus comprising:
a first rotatable member having a cylindrical portion and being configured to scoop up a lubricant when the first rotatable member is rotating;
a shaft-shaped second rotatable member that is rotatable coaxially with and relative to the first rotatable member;
a friction clutch having a first clutch plate that rotates along with the first rotatable member and a second clutch plate that rotates along with the second rotatable member, frictional sliding portions of the first clutch plate and the second clutch plate being lubricated with a lubricant;
a pressing member that moves in a direction of a rotation axis of the first rotatable member and the second rotatable member to press the friction clutch; and
a housing in which a housing chamber for housing the friction clutch is formed and in which a storage chamber for storing the lubricant scooped up by rotation of the first rotatable member is also formed, wherein
the lubricant stored in the storage chamber returns to the housing chamber through an inner circulation path leading to inside the first rotatable member and an outer circulation path leading to outside the first rotatable member, wherein
the pressing member is annular around the rotation axis of the first rotatable member and the second rotatable member, and
the housing is provided with a cylinder chamber to which hydraulic oil applying hydraulic pressure to the pressing member to move the pressing member toward the friction clutch is supplied, and the storage chamber is shaped like a circular ring or a circular arc and provided radially outward of the cylinder chamber.

2. The driving force transmitting apparatus according to claim 1, wherein
the inner circulation path includes a lubricant supply hole that is formed in the housing and through which the lubricant is fed to the housing chamber through a center hole of the pressing member, and includes a communication hole through which the storage chamber and the housing chamber communicate with each other outside the pressing member.

3. The driving force transmitting apparatus according to claim 2, wherein
the storage chamber is formed as a recessed portion that is recessed from the housing chamber in a direction of the rotation axis, and a partition wall member closes an inlet port into which the lubricant scooped up by rotation of the first rotatable member flows and an opening of the recessed portion except for the communication hole.

4. The driving force transmitting apparatus according to claim 3, wherein
the communication hole is defined by a clearance between an outer peripheral end of the partition wall member and an outer peripheral surface of the storage chamber.

5. The driving force transmitting apparatus according to claim 3, wherein
the communication hole is defined by a through-hole formed in the partition wall member.

6. The driving force transmitting apparatus according to claim 1, wherein
the housing has a shaft hole formed in a central portion of the housing, and the lubricant supply hole has an opening in an inner peripheral surface of the storage chamber and extends from the opening toward an inner surface of the shaft hole.

* * * * *